United States Patent
Tsuji et al.

(10) Patent No.: US 10,659,676 B2
(45) Date of Patent: May 19, 2020

(54) METHOD AND APPARATUS FOR TRACKING A MOVING SUBJECT IMAGE BASED ON RELIABILITY OF THE TRACKING STATE

(71) Applicant: CANON KABUSHIKI KAISHA, Tokyo (JP)

(72) Inventors: Ryosuke Tsuji, Kawasaki (JP); Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 15/369,165

(22) Filed: Dec. 5, 2016

(65) Prior Publication Data

US 2017/0163879 A1 Jun. 8, 2017

(30) Foreign Application Priority Data

Dec. 8, 2015 (JP) .................................. 2015-239747
Dec. 25, 2015 (JP) .................................. 2015-254088
Dec. 1, 2016 (JP) .................................. 2016-234392

(51) Int. Cl.
*H04N 7/18* (2006.01)
*H04N 5/232* (2006.01)
*H04N 5/225* (2006.01)
*G06T 7/70* (2017.01)

(52) U.S. Cl.
CPC ........... *H04N 5/23216* (2013.01); *G06T 7/70* (2017.01); *H04N 5/2254* (2013.01); *H04N 5/23267* (2013.01); *H04N 5/23287* (2013.01); *H04N 7/183* (2013.01)

(58) Field of Classification Search
CPC .................................................. H04N 5/23216

USPC .......................................................... 348/143
See application file for complete search history.

(56) References Cited

U.S. PATENT DOCUMENTS

| | | | |
|---|---|---|---|
| 2011/0150280 A1* | 6/2011 | Tsuji | G06T 7/248 382/103 |
| 2012/0020524 A1* | 1/2012 | Ishikawa | H04N 7/183 382/103 |
| 2012/0229651 A1* | 9/2012 | Takizawa | H04N 5/23219 348/169 |

(Continued)

FOREIGN PATENT DOCUMENTS

| | | |
|---|---|---|
| CN | 1577033 A | 2/2005 |
| CN | 1845593 A | 10/2006 |
| CN | 104065868 A | 9/2014 |

(Continued)

OTHER PUBLICATIONS

The above foreign patent documents were cited in a Jul. 30, 2019 Chinese Office Action, a copy of which is enclosed with an English Translation, that issued in Chinese Patent Application No. 201611140487.9.

*Primary Examiner* — Richard T Torrente
(74) *Attorney, Agent, or Firm* — Cowan, Liebowitz & Latman, P.C.

(57) ABSTRACT

A subject tracking apparatus is configured to track a subject in continuously obtained photographic images. In the photographic image, a position of the subject in the photographic image and reliability that represents subject probability are obtained. The position of the subject to a target position in the photographic image is moved a tracking state of the subject is changed on a basis of the reliability.

16 Claims, 9 Drawing Sheets

(56) References Cited

U.S. PATENT DOCUMENTS

2012/0268608 A1* 10/2012 Watanabe .............. H04N 5/232
                                                              348/169
2015/0350556 A1* 12/2015 Lee .................... H04N 5/23219
                                                              348/143

FOREIGN PATENT DOCUMENTS

| CN | 104219436 A   | 12/2014 |
|----|---------------|---------|
| CN | 104349061 A   | 2/2015  |
| CN | 104469139 A   | 3/2015  |
| JP | 07-226873 A   | 8/1995  |
| JP | 2002-251380 A | 9/2002  |
| JP | 2010-093362 A | 4/2010  |

* cited by examiner

METHOD AND APPARATUS FOR TRACKING A MOVING SUBJECT IMAGE BASED ON RELIABILITY OF THE TRACKING STATE

BACKGROUND OF THE INVENTION

Field of the Invention

The present invention relates to a subject tracking apparatus, a control method therefor, a storage medium, and an image pickup apparatus.

Description of the Related Art

Generally in an image pickup apparatus such as a digital camera, important processing in shooting including exposure determination and focusing is automated. Furthermore, with the use of an image pickup apparatus equipped with an anti-vibration control device for preventing image blur due to camera shaking, or the like, it would be possible to substantially eliminate factors that induce shooting errors on the user at the time of shooting.

Meanwhile, shooting of a moving subject or telephotography with a long focal length would involve the following problems.

In the shooting of a moving subject, when the subject goes out of a shooting screen, a user's special technique would be needed in order to track the subject with high accuracy by user's operation. In addition, when the shooting is performed with an image pickup apparatus including a telephoto lens, an effect of image blur due to camera shaking is increased. Accordingly, the user has difficulty in maintaining the subject at a center of the shooting screen. In addition, even when the user operates the image pickup apparatus so as to return the subject to the shooting screen, a camera shake amount due to the operation would be shake-corrected by the image pickup apparatus. As a result, it is difficult to perform fine adjustment operation of positioning the subject onto the shooting screen or at a center of the shooting screen, by the effect of the anti-vibration control.

To cope with such a problem, Japanese Laid-Open Patent Publication (kokai) No. 2010-93362 discloses an image pickup apparatus including a tracking control device, for example, that automatically tracks the subject by moving a part of an optical system in a direction intersecting an optical axis. Furthermore, Japanese Laid-Open Patent Publication (kokai) No. H07-226873 discloses an image pickup apparatus that is configured to extract a target subject from an image obtained as a result of shooting and then to track the subject with a rotary head, or the like, such that a centroid position of the subject comes around the center of the shooting screen.

It should be noted that in the following description, extracting a specific subject region from sequentially supplied photographic images will be referred to as tracing, and controlling a movable part such as a part of the optical system, or a rotary head, on the basis of a subject position as a result of tracing will be referred to as tracking.

SUMMARY OF THE INVENTION

Accordingly, the present invention provides a subject tracking apparatus comprising a shift unit configured to shift a subject in a photographic image, a subject tracing unit configured to obtain, in the photographic image, a position of the subject in the photographic image and reliability that represents subject probability, and a control unit configured to move the position of the subject in the photographic image to a target position in the photographic image by controlling the shift unit and change a tracking state of the subject on a basis of the reliability.

Further features of the present invention will become apparent from the following description of exemplary embodiments (with reference to the attached drawings).

BRIEF DESCRIPTION OF THE DRAWINGS

FIGS. 3A and 3B are diagrams for explaining tracking of a subject detected by a camera shown in FIG. 2, specifically.

FIGS. 5A and 5B are diagrams for explaining template matching processing performed in the subject tracing unit shown in FIG. 2, specifically

DESCRIPTION OF THE EMBODIMENTS

In the image pickup apparatus disclosed in Japanese Laid-Open Patent Publication (kokai) No. H07-226873, accuracy for estimating the centroid position extracted from the photographic image would affect tracking control performed by the rotary head.

Moreover, in a process of tracing the subject, when the photographic image includes a region similar to the tracing target, a wrong region might be traced. In addition, tracking performed on the basis of a wrong tracing result would significantly interfere with the shooting by the user.

Accordingly, hereinafter, an example of a subject tracking apparatus capable of reducing wrong tracking operation attributed to wrong subject tracing, a control method therefor, a storage medium, and an image pickup apparatus including a subject tracking apparatus, according to embodiments of the present invention, will be described with reference to the drawings. It should be noted that, while each of the following first embodiment and the second embodiment describes an exemplary case of applying the present invention to a digital camera as the image pickup apparatus, the present invention is applicable not only to a digital camera but also to an image pickup apparatus such as a digital video camera, a surveillance camera, a web camera, and a mobile phone. Moreover, the present invention is also applicable to any of a lens interchangeable camera and a lens integrated camera.

First Embodiment

Figure 1:
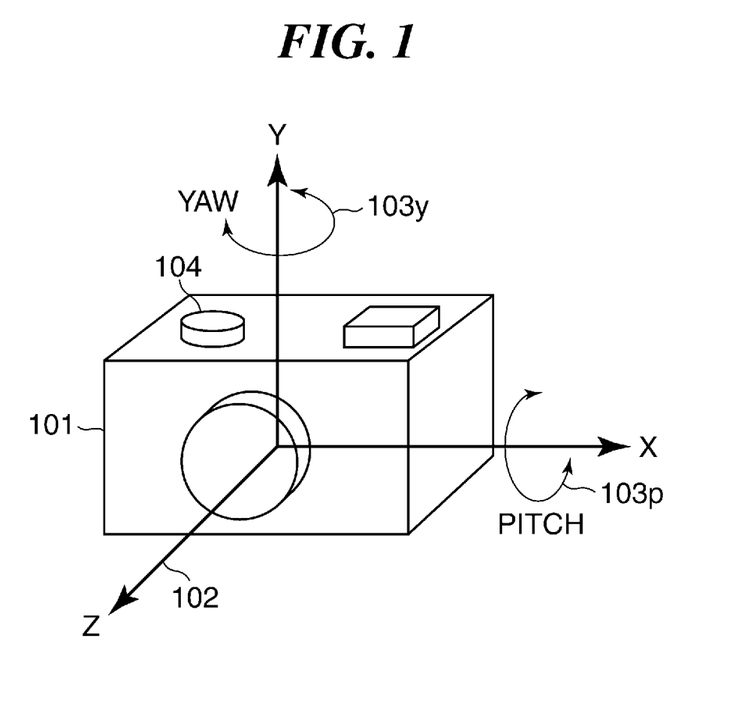
FIG. 1 is a diagram schematically showing an appearance of an exemplary image pickup apparatus including a subject tracking apparatus according to an embodiment of the present invention.

FIG. 1 is a diagram schematically showing an appearance of an exemplary image pickup apparatus including a subject tracking apparatus according to the present embodiment.

The image pickup apparatus in the diagram is, for example, a digital camera (hereinafter, simply referred to as a camera) 101, in which a release button 104 is arranged on an upper surface of a camera housing. Herein, an axis extending in a side surface direction of the camera 101 is defined as an X-axis, and an axis extending in a top surface direction is defined as a Y-axis. Additionally, an axis extending in a front surface direction of the camera 101 is defined as a Z-axis. Rotation 103p around the X-axis is defined as pitch, rotation 103y around the Y-axis is defined as yaw.

Figure 2:
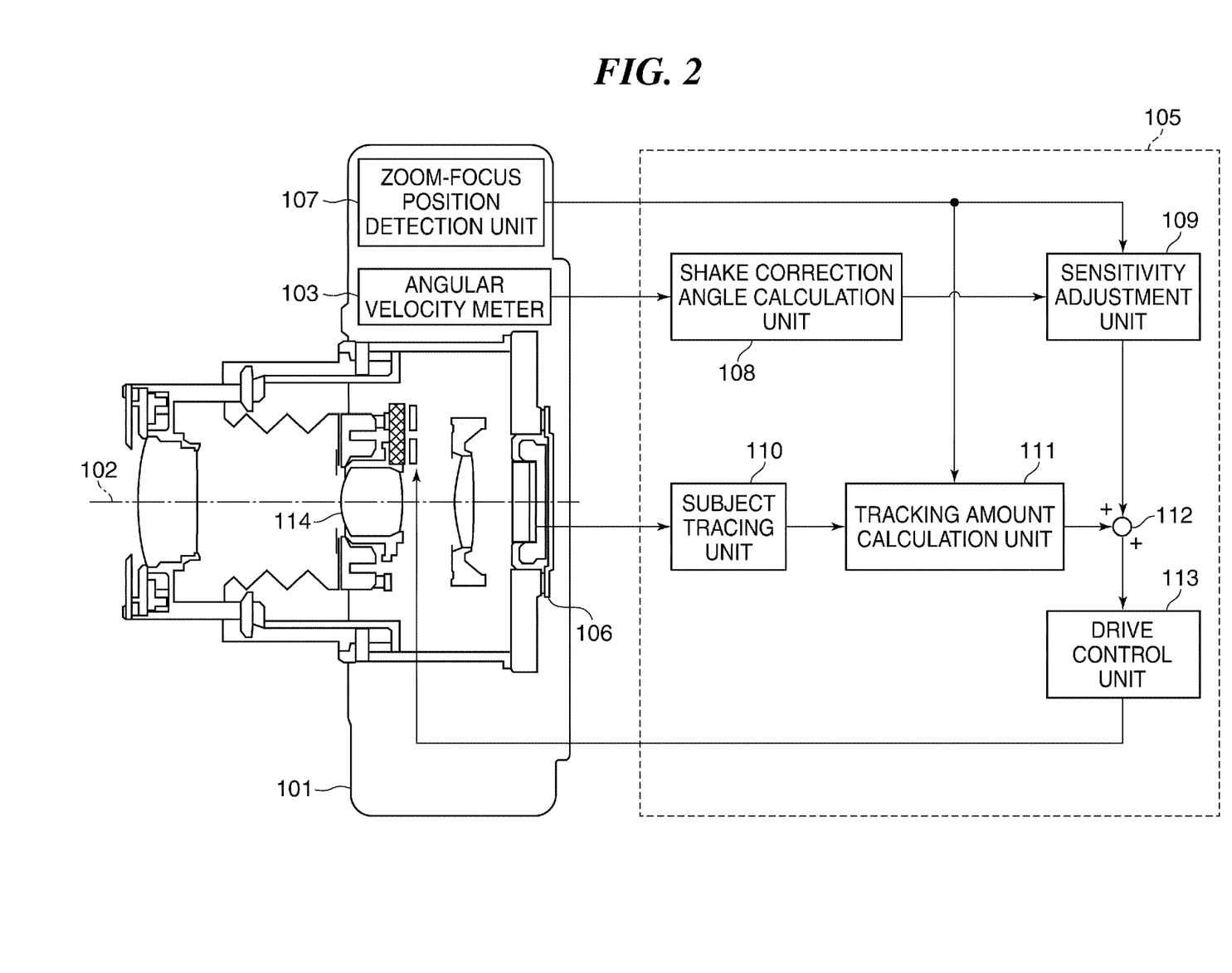
FIG. 2 is a diagram showing an exemplary configuration of a camera shown in FIG. 1.

FIG. 2 is a diagram showing an exemplary configuration of the camera shown in FIG. 1.

With reference to FIGS. 1 and 2, a correction lens 114 and an image sensor 106 are located on an optical axis 102 of an image pickup optical system. The image sensor 106 generates an electrical signal (analog signal) corresponding to an optical image formed via the image pickup optical system, A/D converts the analog signal, and outputs the converted signal as a photographic image. It should be noted that, although not shown, the image pickup optical system includes a zoom lens and a focusing lens. An angular velocity meter 103 detects an angular shake in the pitch 103p and yaw 103y (shakes in the camera 101) and transmits an angular shake signal to a CPU 105. The CPU 105 constitutes the subject tracking apparatus according to the present embodiment.

In the CPU 105, a shake correction angle calculation unit 108 obtains a shake correction angle on the basis of the angular shake signal. For example, the shake correction angle calculation unit 108 cuts off a DC component added as detection noise on the angular shake signal and thereafter performs integration processing to output an angular signal indicating an angle of the camera 101. It should be noted that an exemplary method for cutting off the DC component includes the use of a high-pass filter (HPF). Subsequently, the angular signal is transmitted to a sensitivity adjustment unit 109.

A zoom position and a focus position, respectively indicating a zoom lens position and a focusing lens position, are transmitted from a zoom-focus position detection unit 107 to the sensitivity adjustment unit 109. The sensitivity adjustment unit 109 obtains a focal length and a shooting magnification on the basis of the zoom position and the focus position. Subsequently, the sensitivity adjustment unit 109 amplifies the angular signal in accordance with the focal length and the shooting magnification, and defines it as a shake correction target value. The sensitivity adjustment unit 109 transmits a shake correction target value to a drive control unit 113, as a shake correction amount.

It should be noted that shake correction sensitivity on a camera image plane with respect to a shake correction stroke on the correction lens 114 changes with the positional change of the focusing lens and the zoom lens. Accordingly, herein, a shake correction target value is obtained on the basis of the zoom position and the focus position.

The above-described correction lens 114 is utilized to shift a subject as a tracking target (tracking target subject) in an image obtained as a result of shooting. As described below, the drive control unit 113 tracks the subject by performing drive control of the correction lens 114. Furthermore, the drive control unit 113 corrects image blur (optical anti-vibration) by driving the correction lens 114 in a direction different from the optical axis (for example, direction intersecting the optical axis).

In an exemplary case shown in FIG. 2, optical anti-vibration is performed using the correction lens 114. Alternatively, as another image blur correction technique, it is allowable to use a technique of performing image blur correction by moving the image sensor 106 within a plane orthogonal to the optical axis. Furthermore, it is allowable to use electronic anti-vibration in which an image cutout position is changed for each of photographic frames as output of the image sensor 106 so as to reduce effects of vibration. In addition, it is also allowable to combine and use the above-described plurality of image blur correction methods.

A subject tracing unit 110 receives a photographic image as output of the image sensor 106 and extracts the position of a subject region in the photographic image. A centroid position of the subject region is used as the position of a subject in this embodiment. Furthermore, the subject tracing unit 110 obtains reliability (likelihood) representing subject probability and transmits the centroid position and the likelihood to a tracking amount calculation unit 111. On the basis of the centroid position of the subject region, the tracking amount calculation unit 111 calculates a tracking correction amount as a control amount to be used for tracking the subject by the correction lens 114. Additionally, the tracking amount calculation unit 111 changes the tracking correction amount on the basis of the likelihood.

An adder 112 adds the shake correction amount as the output of the sensitivity adjustment unit 109 with the tracking correction amount as the output of the tracking amount calculation unit 111, and transmits a result of addition to the drive control unit 113. The drive control unit 113 obtains a drive amount of the correction lens 114 on the basis of a result of addition as output of the adder 112, drives the correction lens 114 on the basis of the drive amount, and performs subject tracking and image blur correction.

Figure 3A:
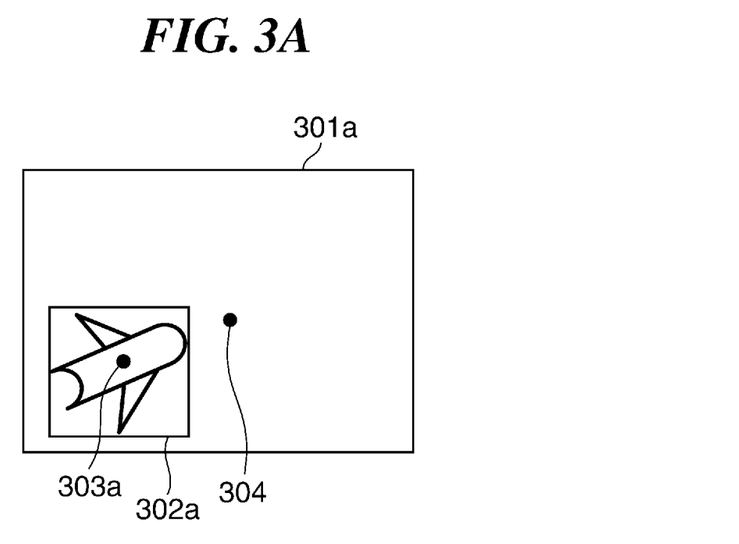
FIG. 3A is a diagram showing a photographic image before subject tracking is started.
Figure 3B:
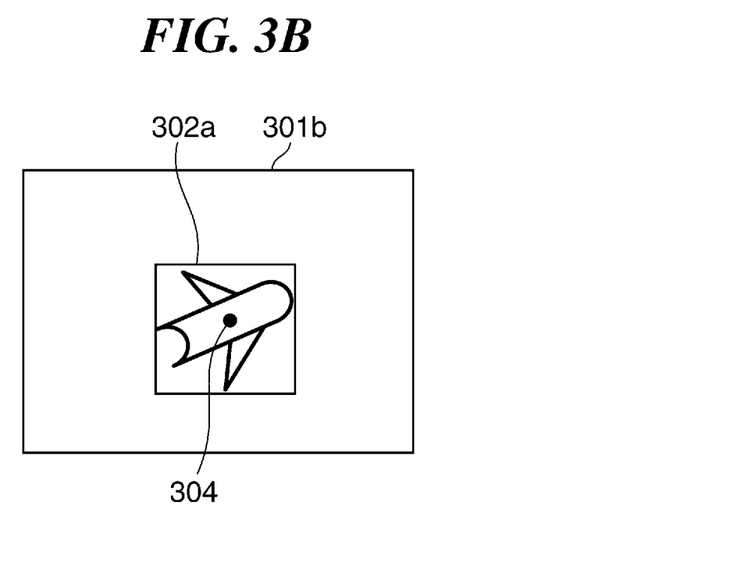
FIG. 3B is a diagram of the photographic image after subject tracking is started.

FIGS. 3A and 3B are diagrams for explaining tracking of the subject detected by the camera shown in FIG. 2. Specifically, FIG. 3A is a diagram showing a photographic image before subject tracking is started, and FIG. 3B is a diagram of the photographic image after subject tracking is started.

In a photographic image 301a shown in FIG. 3A, a subject 302a exists at a position away from an image center 304. Herein, a centroid position (subject centroid position) of the subject 302a is indicated by a reference number 303a. Using tracking (also referred to as tracking control), the CPU 105 gradually moves the subject centroid position 303a closer to the image center 304 so that, at last, the image center 304 and the subject centroid position 303a substantially match with each other. With this tracking, the subject centroid position 303a of the successfully tracked subject 302a matches with the image center 304, as shown in FIG. 3B.

Hereinafter, a subject tracing method performed on the subject tracing unit 110 will be described. In an exemplary diagram, the subject tracing uses a technique (template matching) of defining a partial image including a target subject as a template and performs matching between the template and a photographic image while shifting the template so as to estimate a region having low dissimilarity. Additionally, in order to enable scale conversion in a time direction for the target subject, a technique of estimating the subject region on the basis of a distribution state of a feature color of the photographic image by extracting a feature color of the subject is also used. The template is updated on the basis of the estimated subject region.

Figure 4:
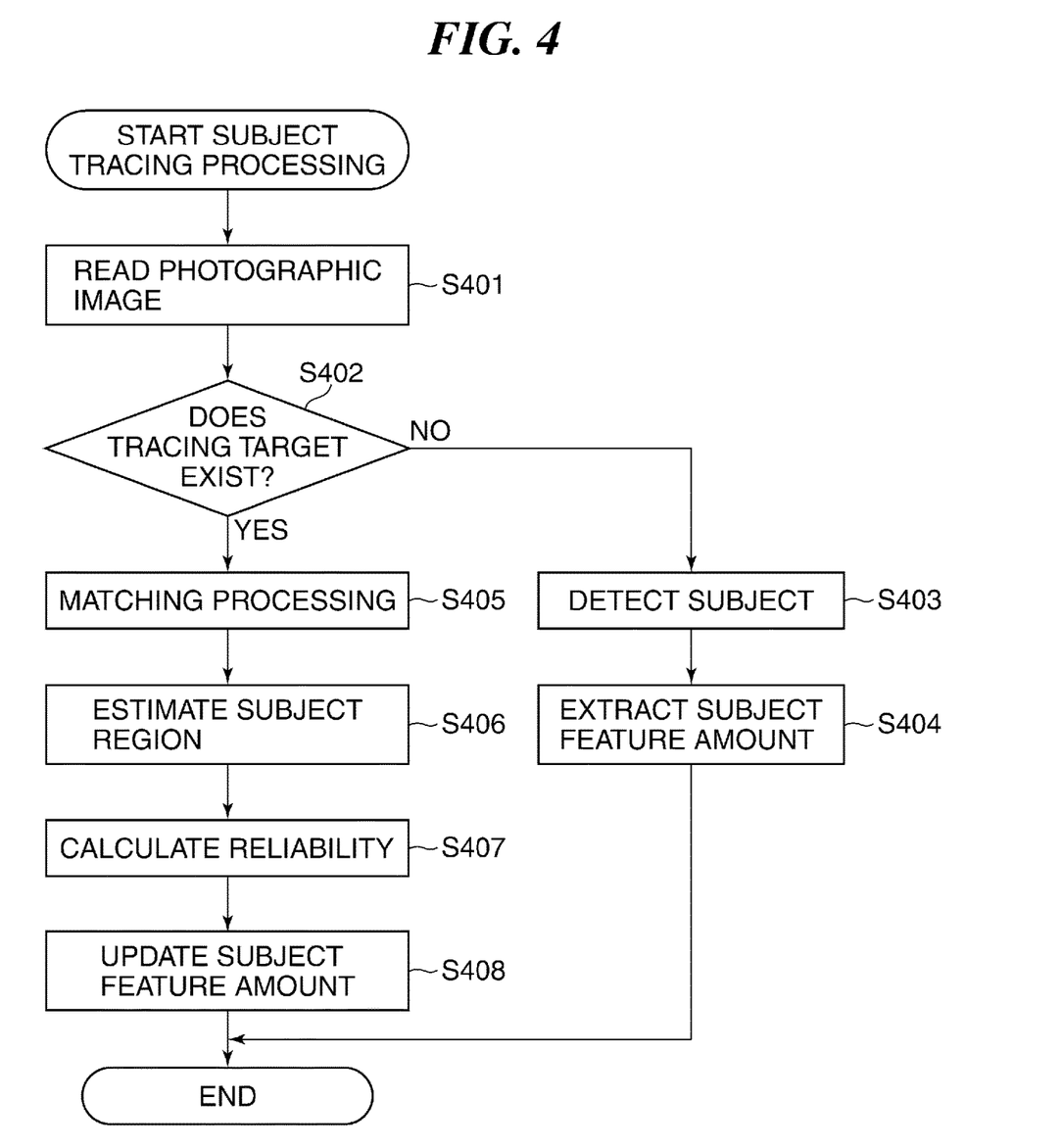
FIG. 4 is a flowchart for explaining exemplary subject tracing processing performed in a subject tracing unit shown in FIG. 2.

FIG. 4 is a flowchart for explaining exemplary subject tracing processing performed in the subject tracing unit 110 shown in FIG. 2.

After subject tracing processing is started, the subject tracing unit 110 reads a photographic image from the image sensor 106 (step S401). Subsequently, the subject tracing unit 110 determines whether a predetermined tracing target subject exists in the photographic image (step S402). When the tracing target subject does not exist (NO in the step S402), the subject tracing unit 110 detects the subject in the photographic image in order to determine the tracing target subject (step S403).

In processing in the step S403, the subject tracing unit 110 detects the subject on the basis of a user's instruction or detects the subject automatically. When the subject is detected on the basis of a user's instruction, the user instructs the position of the subject in the photographic image using an input interface including a touch panel and buttons. Subsequently, the subject tracing unit 110 detects the subject on the basis of the position instructed by the user and extracts the subject region.

In contrast, in automatic detection of the subject, the subject tracing unit 110 uses face detection. Exemplary face detection techniques include a technique of using information on a face (skin color information, parts such as eyes, nose, and mouth) and a technique of constituting a classifier for face detection using learning algorithms represented by a neural network method. Additionally, typical face detection is performed by combining the above-described techniques in order to enhance the detection rate. For face detection, there is a known technique of performing face detection using a wavelet transform and an image feature amount, disclosed in Japanese Laid-Open Patent Publication (kokai) No. 2002-251380, for example.

Next, the subject tracing unit 110 extracts a feature amount of the tracing target subject from the subject region (step S404). Herein, tracing processing is performed using template matching, and thus, an image pattern of the subject region is extracted as the feature amount. Furthermore, since estimation of the subject region is performed on the basis of distribution of feature colors, a color histogram Hin of the subject region is maintained. Thereafter, the subject tracing unit 110 finishes the subject tracing processing and waits for the next sampling cycle of shooting.

In contrast, when the tracing target subject exists (YES in the step S402), the subject tracing unit 110 performs template matching processing using the template (step S405).

Figure 5A:
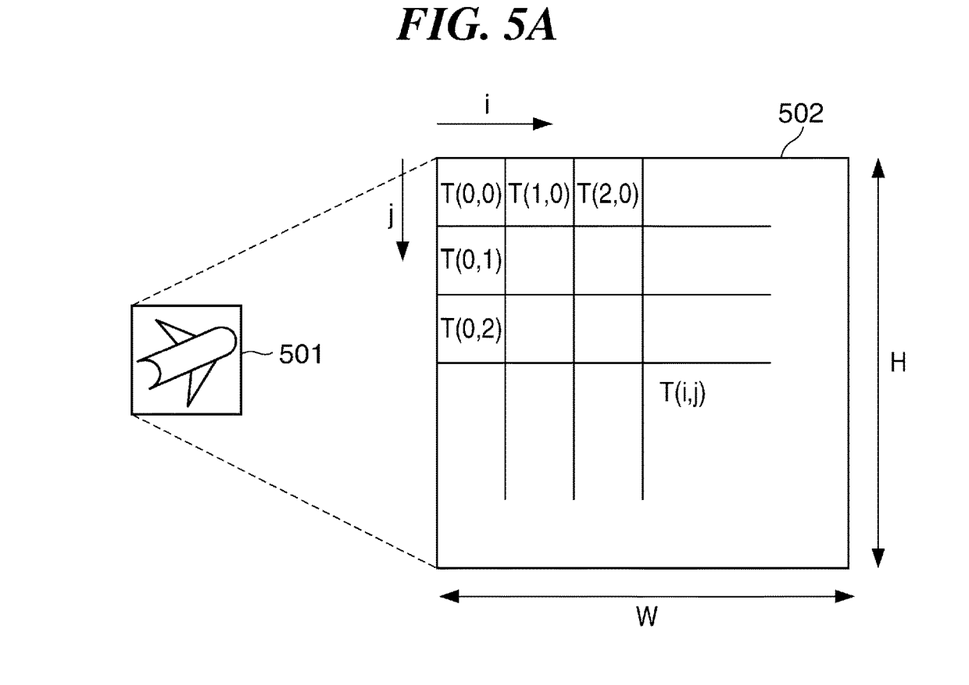
FIG. 5A is a diagram showing an exemplary subject model (template) in template matching processing.
Figure 5B:
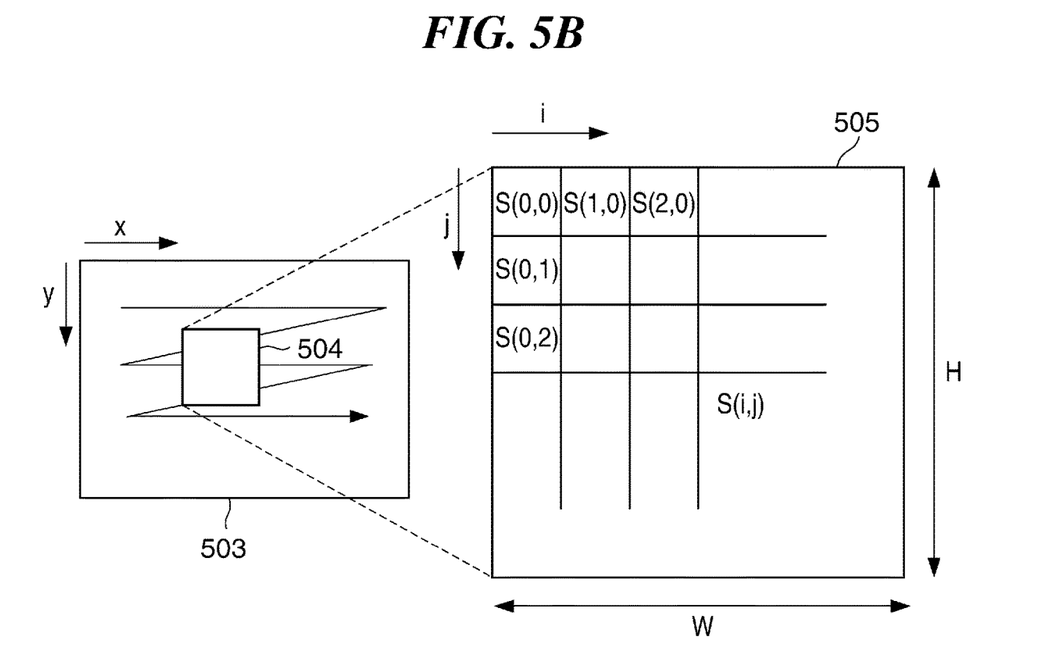
FIG. 5B is a diagram showing an exemplary image for searching a tracing target subject.

FIGS. 5A and 5B are diagrams for explaining the template matching processing performed on the subject tracing unit 110 shown in FIG. 2. Specifically, FIG. 5A is a diagram showing an exemplary subject model (template) in the template matching processing, and FIG. 5B is a diagram showing an exemplary image in which the tracing target subject is searched.

Herein, a pixel pattern of a partial image (template) 501 indicating the tracing target subject is used as a feature amount. In addition, luminance of the pixel data is used as a feature amount 502 of the template 501. When coordinates within the template is (i, j), the number of horizontal pixels is W, and the number of vertical pixels is H, a feature amount T (i, j) is expressed by the following Formula (1).

[Mathematical Expression 1]

$$T(i,j)=\{T(0,0),T(1,0),\ldots,T(W-1,H-1)\} \quad (1)$$

In FIG. 5B, the coordinates on a search image 503 that is a range for performing matching processing, is defined as (x, y). In the search image 503, a partial region 504 for acquisition of an evaluation value of template matching is set. For a feature amount 505 of the partial region 504, luminance of the photographic image is used, similarly to the template 501. When coordinates within the partial region 504 is (i, j), the number of horizontal pixels is W, and the number of vertical pixels is H, a feature amount S (i, j) is expressed by the following Formula (2).

[Mathematical Expression 2]

$$S(i,j)=\{S(0,0),S(1,0),\ldots,S(W-1,H-1)\} \quad (2)$$

In evaluation of the level of similarity between the template 501 and the partial region 504, a sum of absolute difference (SAD) value is used. The SAD value is obtained by the following Formula (3).

[Mathematical Expression 3]

$$V(x,y)=\Sigma_{y=0}^{H-1}\Sigma_{x=0}^{W-1}|T(i,j)-S(i,j)| \quad (3)$$

A SAD value V (x, y) is obtained by shifting pixels of the partial region 504 sequentially in an order from an upper left position on the search image 503, one pixel at a time. The coordinates (x, y) on which the SAD value V (x, y) indicates a minimum value represents a position having the highest level of similarity with the template 501. In other words, the position indicating the minimum value would be defined as a position on which the tracing target subject exists with high probability, on the search image 503.

Herein, description is given on an example using first-dimensional information including luminance (luminance signal) as the feature amount. Alternatively, it is allowable to use three-dimensional information including brightness, hue, and saturation, as the feature amount. Additionally, while the SAD value is used for acquisition of the evaluation value for the template matching, it is also allowable to use a technique such as normalized correlation coefficient (NCC).

Referring back to FIG. 4, the subject tracing unit 110 estimates a subject region on the basis of the position estimated by the template matching processing (step S406). Herein, the subject tracing unit 110 obtains an information amount I(a) shown in the following Formula (4) on the basis of the color histogram Hin of the subject region obtained in the step S404 and a color histogram Hout for all or part of the photographic image at current time.

[Mathematical Expression 4]

$$I(a)=-\log_2 H_{in}(a)/H_{out}(a) \quad (4)$$

The information amount I(a) represents occurrence probability of the subject region for all or part of the photographic image, on each of the bins on the color histogram. The subject tracing unit 110 applies the information amount I(a) to each of pixels of the photographic image at the current time and generates a map indicating probability of the existence of the subject in the search image 503. Subsequently, the subject tracing unit 110 estimates the subject region on the basis of the map and outputs the centroid position of the estimated subject region.

Next, the subject tracing unit 110 calculates likelihood of subject tracing (step S407). Exemplary factors that interfere with the certainty of subject tracing include a change in the subject, existence of a similar subject, and accumulation of tracing errors. The subject tracing unit 110 calculates the likelihood by multiplying these factors to the evaluation values obtained by the template matching processing and the estimation of the subject region.

The greater the minimum value of the SAD V (x, y) obtained by the above-described the Formula (3), the greater the change in the subject. Accordingly, the subject tracing unit 110 sets the likelihood such that the greater the minimum value, the lower the likelihood. In a case where the SAD value similar to the minimum value of the SAD value V (x, y) obtained by the Formula (3) exists at a position away from the estimation position of the subject by a predetermined threshold or above, the similar subject is likely to exist. Therefore, the subject tracing unit 110 sets the likelihood such that the higher the similarity level between the SAD value existing at a position away from the estimation position of the subject by the predetermined threshold or above, and the minimum value of the SAD value V (x, y) obtained by the Formula (3), the lower the likelihood.

It should be noted that the smaller entropy Ein as an average value (expected value) within the subject region regarding the information amount I(a) representing the feature color of the subject, obtained by the Formula (4), the greater the change in the subject. The entropy Ein is represented by the following Formula (5).

[Mathematical Expression 5]

$$E_{in} = -\Sigma_{out}^{H} H_{in}(a) I(a) \quad (5)$$

The subject tracing unit 110 sets the likelihood such that the smaller the entropy Ein, the lower the likelihood. Furthermore, regarding the information amount I(a) representing the feature color of the subject represented in the Formula (4), the greater entropy Eout as an average value (expected value) outside the subject region, the higher the probability of existence of a similar target. The entropy Eout is represented by the following Formula (6).

[Mathematical Expression 6]

$$E_{out} = -\Sigma_{out}^{H} H_{out}(a) I(a) \quad (6)$$

The subject tracing unit 110 sets the likelihood such that the greater the entropy Eout, the lower the likelihood. Furthermore, as the certainty of subject tracing is lowered once, the reliability of tracing thereafter would also be lowered. Therefore, the subject tracing unit 110 takes likelihood of history into consideration when calculating the likelihood. For example, an average value of the likelihood for a predetermined period of time is used as likelihood of the current frame. In this manner, the subject tracing unit 110 calculates likelihood of the subject tracing.

Next, the subject tracing unit 110 updates the subject feature amount (step S408). Herein, the subject tracing unit 110 handles a change in a scale of the subject by updating the template on the basis of the subject region estimated in the processing in the step S406. Thereafter, the subject tracing unit 110 finishes the subject tracing processing and waits for the next sampling cycle of shooting.

Figure 6:
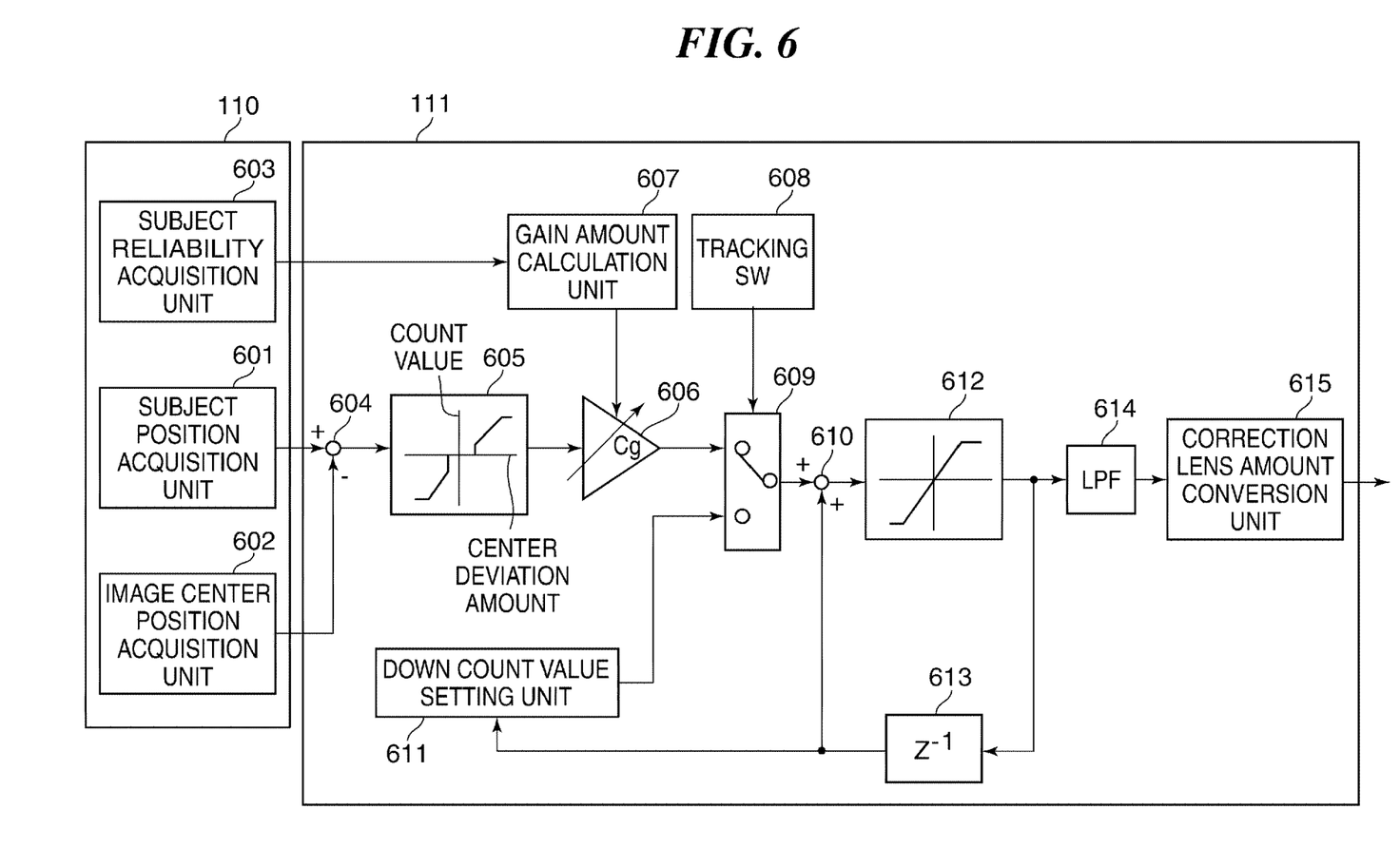
FIG. 6 is a block diagram for explaining an exemplary tracking amount calculation unit shown in FIG. 2.

FIG. 6 is a block diagram for explaining an exemplary tracking amount calculation unit 111 shown in FIG. 2.

The tracking amount calculation unit 111 obtains a tracking correction amount in each of vertical and horizontal directions of an image. Herein, however, calculation of the tracking correction amount in one direction will be described. The tracking amount calculation unit 111 calculates a count value for tracking the subject on the basis of a difference between the subject position (namely, centroid position) and the image center position (subject target position). The tracking amount calculation unit 111 controls such that the position of the subject moves to the target position by adding the count value for each of the sampling times. Subsequently, the tracking amount calculation unit 111 changes a tracking level by changing the magnitude of the count value on the basis of the likelihood (subject likelihood) as an output of the subject tracing unit 110.

A subtractor 604 subtracts coordinates of the image center position obtained by an image center position acquisition unit 602, from the coordinates of the subject position obtained by a subject position acquisition unit 601. With this calculation, a distance (center deviation amount) between the image center position and the subject centroid position in the image is calculation. The center deviation amount corresponds to data with a sign at a time when the image center is defined as zero. The output of the subtractor 604 is input into a count value table 605, and a count value corresponding to the length of the distance for the difference between the subject centroid position and the image center is output from the count value table 605. It should be noted that the subject position acquisition unit 601 may obtain the subject position on the coordinates on which the image center position is defined as a center (having coordinates x, y=0, 0).

It should be noted that the tracking amount calculation unit 111 sets the count value to zero in one of cases where the center deviation amount is equal to a threshold Z or below and the center deviation amount is equal to a threshold −Z or above. This configuration sets a dead band region in which tracking is not performed within a range ±Z from the image center. It should be noted that the count value table 605 is a table on which the greater the center deviation amount, the greater the count value, and the sign of the count value is made to follow the sign of the center deviation amount.

The output of the count value table 605 is input into a variable gain device 606. A gain amount calculation unit 607 calculates gain (control gain) associated with the count value on the basis of the subject likelihood obtained by a subject likelihood acquisition unit 603. Herein, when the subject likelihood is high, the gain amount calculation unit 607 judges that a correct subject is successfully traced and increases the gain in order to enhance a tracking response. In contrast, when the subject likelihood is low, there is a possibility that a wrong subject is traced. Tracking a subject that is a wrong tracing target would greatly interfere with shooting performed by the user. To avoid this, the gain amount calculation unit 607 decreases the gain when the subject likelihood is low. At this time, in a case where the subject likelihood is equal to the threshold or below, it is allowable to set the gain to zero and stop tracking control. Alternative to set the gain to zero, it is allowable to stop the tracking control by turning off a tracing switch 608. Subsequently, the gain amount calculation unit 607 sets the calculated gain (gain amount) as a variable gain Cg onto the variable gain device 606.

The output of the variable gain device 606 is input into a signal selection unit 609. A down count value of a down count value setting unit 611 and setting of the tracking switch 608 are input into the signal selection unit 609. When the tracking switch 608 is on, the signal selection unit 609 selects the output of the variable gain device 606. In contrast, when the tracking switch 608 is off, the signal selection unit 609 selects the output of the down count value setting unit 611. Subsequently, the output of the signal selection unit 609 is input into an adder 610.

The down count value setting unit 611 sets a down count value. A tracking amount last sample value is input from a sampling unit 613 into the down count value setting unit 611. When the tracking amount last sample value has a positive sign, the down count value setting unit 611 sets the down count value to a negative value. In contrast, when the tracking amount last sample value has a negative sign, the down count value setting unit 611 sets the down count value to a positive value. With this setting, the down count value setting unit 611 decreases the absolute value of the tracking correction amount. It should be noted that, when the tracking amount last sample value is within a 0±predetermined range, the down count value setting unit 611 sets the down count value to zero. Additionally, the tracking amount last sample value represents a tracking correction amount for the last sampling or before.

The adder 610 adds the output of the signal selection unit 609 and the tracking amount last sample value. When a negative down count value is added to the tracking amount last sample value, the absolute value of the tracking correction amount is decreased. The output of the adder 610 is input into an upper-lower limit value setting unit 612. The upper-lower limit value setting unit 612 sets the tracking correction amount to an amount that is below a predetermined upper limit value and that exceeds a predetermined lower limit value. The output of the upper-lower limit value setting unit 612 is input into the sampling unit 613 and an LPF 614. The LPF 614 transmits the tracking correction amount from which high-frequency noise has been cut off, to a correction lens amount conversion unit 615. The correction lens amount conversion unit 615 converts the tracking correction amount into a signal mode for tracking with the correction lens 114 and outputs the ultimate tracking correction amount.

In this manner, the tracking amount calculation unit 111 obtains a count value for each of the sampling corresponding to the difference between the image center position and the subject position, and adds the count value to the tracking correction amount, thereby performing tracking of gradually moving the subject position to a position around the image center.

It should be noted that while, in the above description, the gain amount calculation unit 607 sets the gain on the basis of subject likelihood, it is also allowable to configure such that the gain amount calculation unit 607 sets the gain on the basis of the centroid position of the photographic image, in addition to the subject likelihood.

As described above, the subject tracing unit 110 estimates a target subject region from a photographic image. Therefore, tracking needs to be performed so as to accommodate the target subject within the photographic image. In a case where the target subject exists at an end of the photographic image, it is highly possible that the subject is dislocated from the photographic image in the next and the following frames. To avoid this, moving the subject onto the image center (target position) by tracking would be important.

In contrast, in a case where the target subject exists around the center of the photographic image (target position), it is unlikely that the subject is dislocated from the photographic image in the next and the following frames. In this case, significance of tracking would be reduced. Accordingly, control is performed such that the lower the subject likelihood, the lower a tracking level (namely, a tracking state), and together with this, control is performed such that the closer the subject centroid position to the image center (target position), the lower the tracking level.

Figure 7:
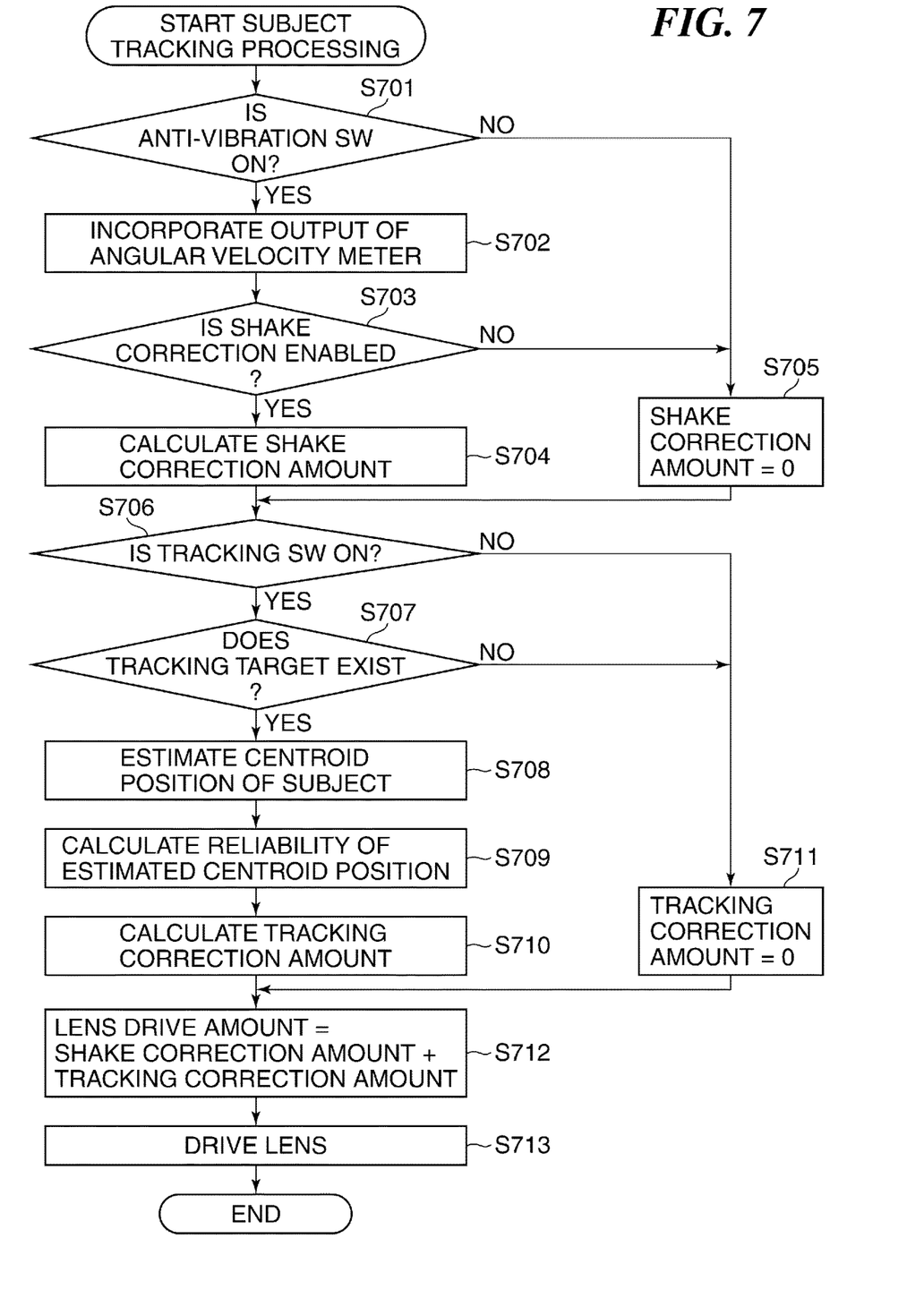
FIG. 7 is a flowchart for explaining exemplary subject tracking performed on the camera shown in FIG. 2.

FIG. 7 is a flowchart for explaining exemplary subject tracking performed on the camera shown in FIG. 2. It should be noted that the processing associated with the flowchart in the diagram is started when a main power of the camera 101 is turned on, and performed with a predetermined sampling cycle.

First, the CPU 105 determines whether an anti-vibration SW (not shown) is on (step S701). When the anti-vibration SW is on (YES in the step S701), the CPU 105 incorporates the output of the angular velocity meter 103 (step S702). Subsequently, the CPU 105 determines whether the camera 101 is in a state capable of performing shake correction (step S703). Herein, the CPU 105 determines that the camera 101 is not in a state capable of performing shake correction in a case where the camera 101 is in a state after the power is supplied and before the output of the angular velocity meter 103 is stabilized. In contrast, the CPU 105 determines that the camera 101 is in a state capable of performing shake correction in a case where the camera 101 is in a state after the output of the angular velocity meter 103 is stabilized. With this configuration, shake correction is not performed in a state where the output of the angular velocity meter 103 is instable immediately after power supply.

In a case where the camera 101 is in a state capable of performing shake correction (YES in the step S703), the CPU 105 obtains a shake correction amount as described above by the shake correction angle calculation unit 108 and the sensitivity adjustment unit 109, on the basis of the output of the angular velocity meter 103 (step S704). In contrast, in a case where the camera 101 is not in a state capable of performing shake correction (NO in the step S703), the CPU 105 sets the shake correction amount to zero (step S705). It should be noted when the anti-vibration SW is off (NO in the step S701), the CPU 105 proceeds to processing in the step S705.

After processing in the step S704 or S705, the CPU 105 determines whether tracking SW (not shown) is on (step S706). When the tracking SW is on (YES in the step S706), the CPU 105 determines whether the subject as a tracking target exists in the photographic image continuously obtained from the image sensor 106 (step S707). When the subject as the tracking target exists (YES in the step S707), the CPU 105 estimates the centroid position of the subject region in the photographic image (step S708).

Next, the CPU 105 obtains subject likelihood associated with the centroid position as described above (step S709). It should be noted that, as described above, processing in the steps S708 and S709 is performed by the subject tracing unit 110. Subsequently, the CPU 105 obtains a tracking correction amount by the tracking amount calculation unit 111, on the basis of the subject centroid position and the subject likelihood (step S710).

When the subject as a tracking target does not exist (NO in the step S707), the CPU 105 sets the tracking correction amount to zero (step S711). It should be noted when the tracking SW is off (NO in the step S706), the CPU 105 proceeds to processing in the step S711.

After processing of the step S710 or S711, the CPU 105 calculates a lens drive amount by adding the shake correction amount and the tracking correction amount (step S712). Subsequently, the CPU 105 performs drive control of the correction lens 114 by the drive control unit 113, on the basis of the lens drive amount (step S713). Thereafter, the CPU 105 finishes the subject tracking processing and waits for the next sampling cycle.

In this manner, according to the present embodiment, the drive control of the correction lens 114 is performed on the basis of the subject centroid position and subject likelihood obtained by tracing the subject. With this configuration, it is possible to prevent tracking operation errors and to perform tracking with high response.

Second Embodiment

The first embodiment describes an image pickup apparatus including a subject tracking apparatus that changes the tracking level on the basis of the subject likelihood. In contrast, the present embodiment will describe an image pickup apparatus including a subject tracking apparatus that not only changes the tracking level on the basis of the subject likelihood but also instructs to notifies (alerts) the photographer that tracking control is difficult in a state where performing the tracking control is difficult. Whether the tracking control is difficult is judged on the basis of the subject likelihood. It should be noted that the configuration of changing the tracking level on the basis of the subject likelihood is similar to the case of the first embodiment and thus, description will be omitted. It should be noted that, a mode in which the subject tracking apparatus is applied to a camera will be described, similarly to the first embodiment.

Figure 8:
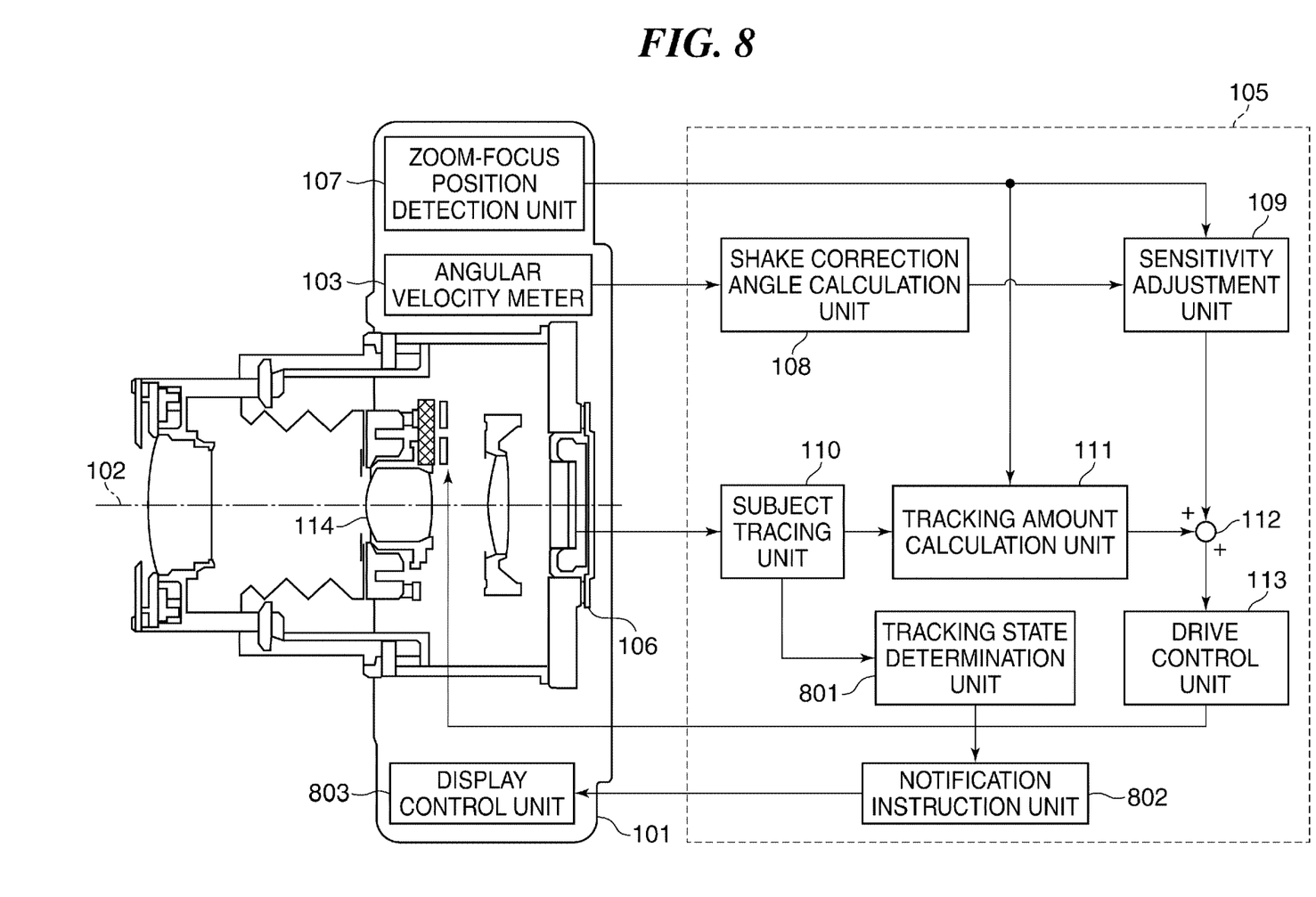
FIG. 8 is a diagram showing an exemplary configuration of a camera according to a second embodiment of the present invention.

A camera configuration according to the present embodiment will be shown in FIG. 8. Differences of the present embodiment from the first embodiment are that the CPU 105 as a subject tracking apparatus includes a tracking state determination unit 801 and a notification instruction unit 802. The tracking state determination unit 801 determines whether the tracking control is difficult on the basis of subject likelihood. The notification instruction unit 802 instructs providing a notification to the photographer on the basis of results of determination by the tracking state determination unit 801. Additionally, the camera 101 in the present embodiment includes a display unit (FIGS. 9A to 9D), and a display control unit 803. The display unit displays an image. The display control unit 803 controls an image displayed on the display unit. The display control unit 803 receives a notification instruction from the notification instruction unit 802 and notifies the photographer that the tracking control is difficult.

Similarly to the first embodiment, the subject tracing unit 110 obtains subject likelihood on a subject set as a tracking target. The obtained subject likelihood is transmitted to the tracking state determination unit 801. On the basis of the subject likelihood received from the subject tracing unit 110, the tracking state determination unit 801 determines whether the subject likelihood is equal to a threshold or below. Subsequently, when the received subject likelihood is equal to the threshold or below, the tracking state determination unit 801 determines that the tracking control is difficult because of low subject likelihood. In contrast, the received subject likelihood is above the threshold, the tracking state determination unit 801 determines that the subject likelihood is high enough to enable the tracking control. The result of determination by the tracking state determination unit 801 is transmitted to the notification instruction unit 802. When the tracking state determination unit 801 determines that the subject likelihood is equal to a threshold or below, the notification instruction unit 802 transmits an instruction to the display control unit 803 to notify the photographer that the tracking control is difficult. Upon receiving the notification instruction to the photographer, from the notification instruction unit 802, the display control unit 803 notifies the photographer that the tracking control is difficult by changing the image displayed on the display unit.

Next, a method of notifying the photographer that the tracking control is difficult will be described using FIGS. 9A to 9H. As shown in FIGS. 9A to 9D, the camera 101 includes, on its back surface, a liquid crystal display 901 that functions as a display unit and is capable of displaying by a live view display, an image captured by the camera 101 prior to shooting. Additionally, the camera 101 has arranged a touch panel 902 under the liquid crystal display 901, thereby obtaining a coordinate position of a subject 903 specified by a touch operation and setting the subject as a tracking target. The subject 903 specified by the touch operation is indicated by a subject frame 904. Upon receiving a notification instruction from the notification instruction unit 802, the display control unit 803 notifies the photographer that the tracking control is difficult by changing the display of a tracking icon 905 displayed on the liquid crystal display 901. An exemplary change of the tracking icon 905 along the change of a tracking control state will be described.

Figure 9A:
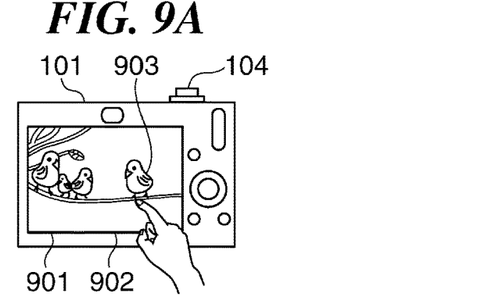
FIGS. 9A to 9H are diagrams for explaining a notification method in the camera shown in FIG. 8.

In FIG. 9A, after the subject 903 as a tracking target is specified by the touch operation, the tracking control is performed, and the tracking icon 905 is displayed on a screen of the liquid crystal display 901 (hereinafter, referred to as the screen) in order to indicate that the tracking control is under operation. The tracking icon 905 is not displayed on the screen during a period in which subject tracking is not under operation (the subject is not specified).

Figure 9B:
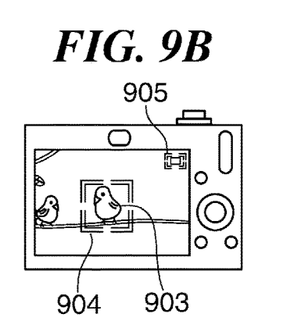

FIG. 9B is a diagram showing a state after the subject is specified. FIG. 9E shows the output of the adder 112, obtained by adding the shake correction amount and the tracking correction amount, in a case where the camera state changes in the order of FIGS. 9A, 9B, 9C, and 9D in the passage of time. Additionally, FIG. 9F shows a change in the subject position, FIG. 9G shows a change in the subject likelihood, and FIG. 9H shows a state of displaying the tracking icon 905. The tracking icon 905 is not displayed on the screen until timing T11 at which the subject is specified by the touch operation shown in FIG. 9A. After the subject as a tracking target is specified as shown in FIG. 9B, the tracking icon 905 is displayed on the screen. Thereafter, even when the specified subject 903 is away from the image center, the tracking control is performed on the basis of the tracking correction amount calculated by the tracking amount calculation unit 111, whereby the subject 903 is returned to the image center as shown in FIG. 9B. It should be noted that the timing of detecting the position after the subject is specified is represented by T11, and the timing of returning the subject to the image center by the tracking control is represented by T12 in the diagram.

Figure 9C:
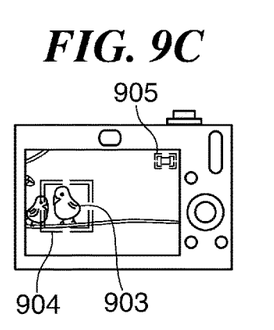
Figure 9D:
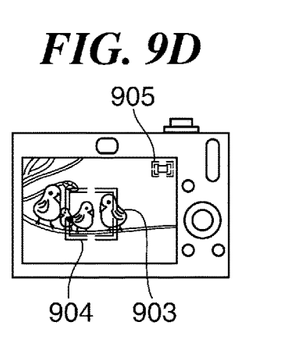
Figure 9E:
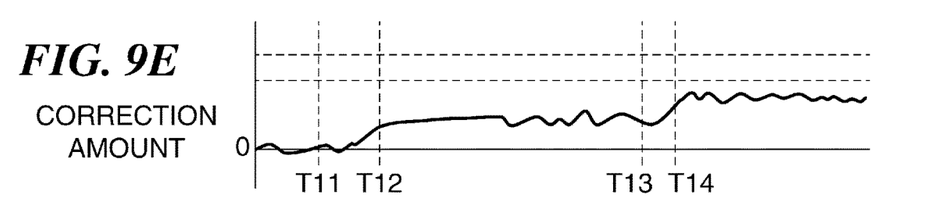
Figure 9F:
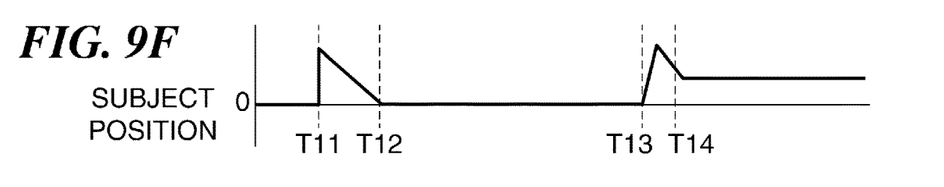
Figure 9G:
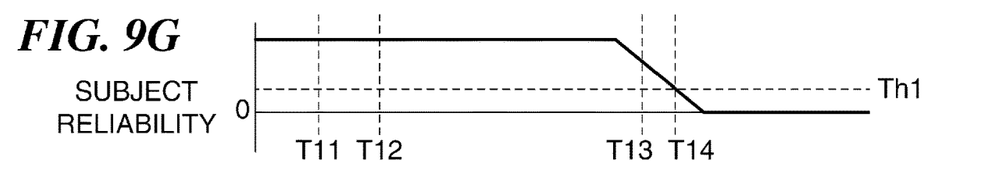
Figure 9H:
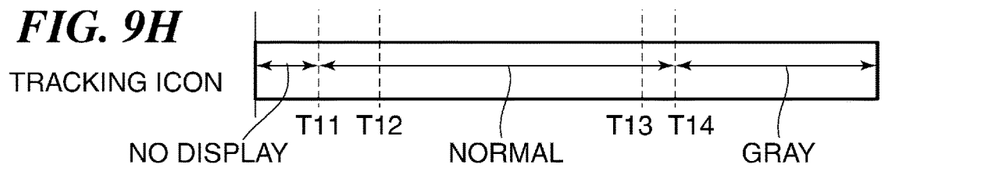

Thereafter, when the subject 903 further moves as shown in FIG. 9C, the tracking control is performed with an increased tracking correction amount. In a case where a plurality of similar subjects appears within the screen as shown in FIG. 9D, subject likelihood is set to a low level. In the present embodiment, when the subject likelihood is equal to a threshold Th1 or below, the setting is configured such that a tracking gain becomes zero and the tracking control is not performed. At this time, in order to let the photographer know that no more tracking is performed, the tracking icon 905 is displayed in gray so as to notify the photographer of a tracking disable state (FIG. 9H).

In this manner, the subject tracking apparatus according to the present embodiment transmits an instruction to change the display of the tracking icon 905 when it determines that the subject likelihood is too low to perform the tracking control. This configuration can encourage the photographer to perform framing of the camera by oneself to move the subject to the image center. It should be noted that the threshold for determining whether to perform the tracking control may be equal to the threshold for notifying the photographer that the tracking control is difficult, or may be different from each other. When the thresholds are equal to each other, it is possible to notify the photographer that the tracking control is not performed. In a case where the threshold for determining whether to perform the tracking control is smaller, it is possible to notify the photographer that the subject likelihood is low while performing the tracking control, and thus, to encourage the photographer to perform framing before the tracking control stops. Accordingly, it is possible to perform the tracking control more smoothly than a case where the tracking control is once stopped and then restarted.

It should be noted that, while it is notified to the photographer that the tracking control is difficult by changing the color of the tracking icon in the present embodiment, the notification method is not limited to this. It is allowable to configure such that another icon indicating low subject likelihood is displayed on the liquid crystal display 901 apart from the tracking icon, and such that an LED lamp is provided on the camera 101 and the lighting states (on, off, flickering, or the like) of the LED lamp appears different at a time when the subject likelihood is low from a time when the subject likelihood is high (when the tracking control is successful).

The above-described embodiments describe a case where a correction lens is used as a shake correction member and is applied to optical anti-vibration in which the correction lens is moved within a plane intersecting (e.g. orthogonal to) the optical axis. In addition to this, the present invention can be applied not only to the optical anti-vibration, but also to subject tracking in which an image sensor is moved within a plane orthogonal to the optical axis, subject tracking that varies cutout positions on individual photographic frames output by the image sensor, subject tracking that rotationally drives the image sensor and a lens barrel including a taking lens group, subject tracking that combines a rotary head that performs pan/tilt operation for another camera, or a combination of the above-described plurality of types of subject tracking.

In an example shown in FIG. 2, as clearly seen from the above description, the correction lens 114 and the CPU 105 function as a shift unit, the CPU 105, the angular velocity meter 103 and the zoom-focus position detection unit 107 function as the subject tracing unit. Additionally, the CPU 105 functions as a control unit. It should be noted that at least the correction lens 114, the CPU 105, the angular velocity meter 103, and the zoom-focus position detection unit 107 constitute the subject tracking apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-239747, filed Dec. 8, 2015, No. 2015-254088, filed Dec. 25, 2015, and No. 2016-234392, filed Dec. 1, 2016, which are hereby incorporated by reference herein in their entirety.

What is claimed is:

1. A subject tracking apparatus comprising:
   a shift unit configured to shift a subject image in a photographic image;
   a subject tracing unit configured to obtain, in the photographic image, a position of the subject image in the photographic image and a reliability that represents subject probability; and
   a control unit configured to obtain a control gain based on the reliability and a distance between the position of the subject image in the photographic image and a target position, obtain a correction amount based on the control gain and the distance, move the position of the subject image in the photographic image so as to reduce the distance by controlling said shift unit based on the correction amount, and change a tracking level of subject tracking by changing the control gain.

2. The subject tracking apparatus according to claim 1, wherein said subject tracing unit obtains an evaluation value by defining a partial region indicating the subject image in the photographic image, as a template, and by performing matching between the template and a partial region of a photographic image obtained after the photographic image used for obtaining the partial image used as the template, and obtains the reliability in accordance with distribution of the evaluation value.

3. The subject tracking apparatus according to claim 1, wherein said subject tracing unit estimates a subject region on a basis of distribution of a feature color of the subject image in the photographic image, and obtains the reliability on the basis of distribution of the feature color within the subject region and outside the subject region.

4. The subject tracking apparatus according to claim 1, wherein, in obtaining the reliability, said subject tracing unit obtains the reliability of the subject in a current photographic image with reference to a history of the reliability.

5. The subject tracking apparatus according to claim 1, wherein said control unit performs control such that lowering of the reliability results in lowering of the tracking level.

6. The subject tracking apparatus according to claim 5, wherein said control unit performs control such that the closer placement of the position of the subject image in the photographic image to the target position results in lowering of the tracking level.

7. The subject tracking apparatus according to claim 1, wherein the control unit controls the shift unit so that a shift amount of the subject image in a photographic image is changed based on the reliability.

8. The subject tracking apparatus according to claim 1, wherein the control unit changes the tracking response by controlling the shift unit so that a shift amount of the subject image in a photographic image is changed based on the reliability.

9. The subject tracking apparatus according to claim 1, wherein the control unit judges whether or not the tracking control is difficult based on the reliability, and instructs, if the control unit judges that the tracking control is difficult, providing a notification to a user that the tracking control is difficult.

10. The subject tracking apparatus according to claim 9, wherein the control unit determines that the tracking control is difficult when the reliability is equal to a predetermined threshold or below.

11. The subject tracking apparatus according to claim 9, further comprising a display,
wherein the control unit changes an image displayed on the display according to whether or not it is judged that the tracking control is difficult.

12. The subject tracking apparatus according to claim 11, wherein a tracking icon displayed on the display is changed according to whether or not it is judged that the tracking control is difficult.

13. An image pickup apparatus comprising:
an image pickup unit configured to obtain a photographic image in accordance with an optical image formed via an image pickup optical system; and
a subject tracking apparatus configured to track a subject by shifting a subject image in continuously obtained photographic images and include a shift unit configured to shift the subject image in the photographic image, a subject tracing unit configured to obtain, in the photographic image, a position of the subject image in the photographic image and a reliability that represents subject probability, and
a control unit configured to obtain a control gain based on the reliability and a distance between the position of the subject image in the photographic image and a target position, obtain a correction amount based on the control gain and the distance, move the position of the subject image in the photographic image so as to reduce the distance by controlling said shift unit based on the correction amount, and change a tracking level of subject tracking by changing the control gain.

14. The image pickup apparatus according to claim 13, wherein said shift unit further includes a correction lens that is provided in the image pickup optical system and that is driven in a direction intersecting an optical axis of the image pickup optical system, and said shift unit configured to shift the subject image in the photographic image by driving the correction lens.

15. A control method for a subject tracking apparatus, the subject tracking apparatus including a shift unit configured to shift a subject image in continuously obtained photographic images and being configured to tracking the subject, the control method comprising:
a subject tracing step of obtaining, in the photographic image, a position of the subject image in the photographic image and a reliability that represents subject probability; and
a control step of obtaining a control gain based on the reliability and a distance between the position of the subject image in the photographic image and a target position, of obtaining a correction amount based on the control gain and the distance, of moving the position of the subject image in the photographic image so as to reduce the distance by controlling the shift unit based on the correction amount, and of changing a tracking level of subject tracking by changing the control gain.

16. A computer-readable non-transitory storage medium storing a program for causing a computer to execute a control method for a subject tracking apparatus, the subject tracking apparatus including a shift unit configured to shift a subject image in continuously obtained photographic images and being configured to track the subject, the control method comprising:
a subject tracing step of obtaining, in the photographic image, a position of the subject image in the photographic image and a reliability that represents subject probability; and
a control step of obtaining a control gain based on the reliability and a distance between the position of the subject image in the photographic image and a target position, of obtaining a correction amount based on the control gain and the distance, of moving the position of the subject image in the photographic image so as to reduce the distance by controlling the shift unit based on the correction amount, and of changing a tracking level of subject tracking by changing the control gain.

* * * * *